US012249682B2

(12) United States Patent
Iwamoto et al.

(10) Patent No.: US 12,249,682 B2
(45) Date of Patent: Mar. 11, 2025

(54) ELECTROCHEMICAL CELL MODULE

(71) Applicant: KYOCERA CORPORATION, Kyoto (JP)

(72) Inventors: Shohei Iwamoto, Higashiosaka (JP); Katsufumi Ooshima, Daito (JP)

(73) Assignee: KYOCERA CORPORATION, Kyoto (JP)

( * ) Notice: Subject to any disclaimer, the term of this patent is extended or adjusted under 35 U.S.C. 154(b) by 762 days.

(21) Appl. No.: 17/434,414

(22) PCT Filed: Feb. 25, 2020

(86) PCT No.: PCT/JP2020/007496
§ 371 (c)(1),
(2) Date: Aug. 27, 2021

(87) PCT Pub. No.: WO2020/179547
PCT Pub. Date: Sep. 10, 2020

(65) Prior Publication Data
US 2022/0158223 A1 May 19, 2022

(30) Foreign Application Priority Data
Mar. 1, 2019 (JP) .................. 2019-037415

(51) Int. Cl.
*H01M 10/0525* (2010.01)
*H01M 10/647* (2014.01)
(Continued)

(52) U.S. Cl.
CPC ..... *H01M 10/0525* (2013.01); *H01M 10/647* (2015.04); *H01M 10/653* (2015.04); *H01M 50/105* (2021.01); *H01M 50/1243* (2021.01); *H01M 50/141* (2021.01); *H01M 50/209* (2021.01); *H01M 50/211* (2021.01); *H01M 50/24* (2021.01); *H01M 50/552* (2021.01)

(58) Field of Classification Search
CPC .......... H01M 10/0525; H01M 10/647; H01M 10/653; H01M 50/1243; H01M 50/209; H01M 50/211; H01M 50/552
USPC ......................................................... 429/149
See application file for complete search history.

(56) References Cited

U.S. PATENT DOCUMENTS

| 2012/0064391 A1* | 3/2012 | Fukaya | H01M 50/136 429/163 |
| 2013/0130087 A1* | 5/2013 | Kawaguchi | H01M 10/658 429/120 |

(Continued)

FOREIGN PATENT DOCUMENTS

| JP | 2000200585 A * | 7/2000 |
| JP | 2007220544 A | 8/2007 |

(Continued)

*Primary Examiner* — James M Erwin
*Assistant Examiner* — Kevin Nguyen
(74) *Attorney, Agent, or Firm* — HAUPTMAN HAM, LLP

(57) ABSTRACT

An electrochemical cell module includes a plurality of electrochemical cells stacked on one another and each including an electricity generator and a casing, and a housing accommodating the plurality of electrochemical cells. The casing includes a peripheral portion without overlapping the electricity generator as viewed in the stacking direction. The peripheral portion is bent and has its main surface in contact with an inner side surface of the housing.

7 Claims, 11 Drawing Sheets

(51) Int. Cl.
*H01M 10/653* (2014.01)
*H01M 50/105* (2021.01)
*H01M 50/124* (2021.01)
*H01M 50/141* (2021.01)
*H01M 50/209* (2021.01)
*H01M 50/211* (2021.01)
*H01M 50/24* (2021.01)
*H01M 50/552* (2021.01)

(56) References Cited

U.S. PATENT DOCUMENTS

2015/0303413 A1* 10/2015 Yun ............... H01M 50/121
 429/185
2015/0364729 A1* 12/2015 Jang ............... H01M 50/178
 429/185

FOREIGN PATENT DOCUMENTS

JP      2013229266 A    11/2013
WO     2019059045 A1    3/2019

* cited by examiner

ELECTROCHEMICAL CELL MODULE

RELATED APPLICATIONS

The present application is a National Phase of International Application No. PCT/JP2020/007496, filed Feb. 25, 2020, and claims priority based on Japanese Patent Application No. 2019-037415, filed Mar. 1, 2019.

FIELD

The present disclosure relates to an electrochemical cell module.

BACKGROUND

A known electrochemical cell module is described in, for example, Patent Literature 1. The electrochemical cell module described in Patent Literature 1 is a battery pack including multiple flat batteries stacked on one another, with each battery having electrode tabs protruding from its ends and bonded to busbars of busbar modules located along the ends. In this electrochemical cell module, a heat collector and a heat dissipater include a substantially L-shaped continuous heat transfer plate. The heat collector is connected to the electrode tabs or the busbars. The heat dissipater extends along surfaces excluding the ends of the battery pack.

CITATION LIST

Patent Literature

Patent Literature 1: Japanese Unexamined Patent Application Publication No. 2013-229266

BRIEF SUMMARY

An electrochemical cell module according to one or more aspects of the present disclosure includes an electrochemical cell including an electricity generator and a casing, and a housing accommodating the electrochemical cell. The electrochemical cell is plate-like and has a first main surface. The casing includes a peripheral portion without overlapping the electricity generator as viewed in a direction perpendicular to the first main surface. The peripheral portion is bent and has the first main surface in contact with an inner side surface of the housing.

BRIEF DESCRIPTION OF DRAWINGS

The objects, features, and advantages of the present invention will become more apparent from the following detailed description and the drawings.

DETAILED DESCRIPTION

Figure 1:
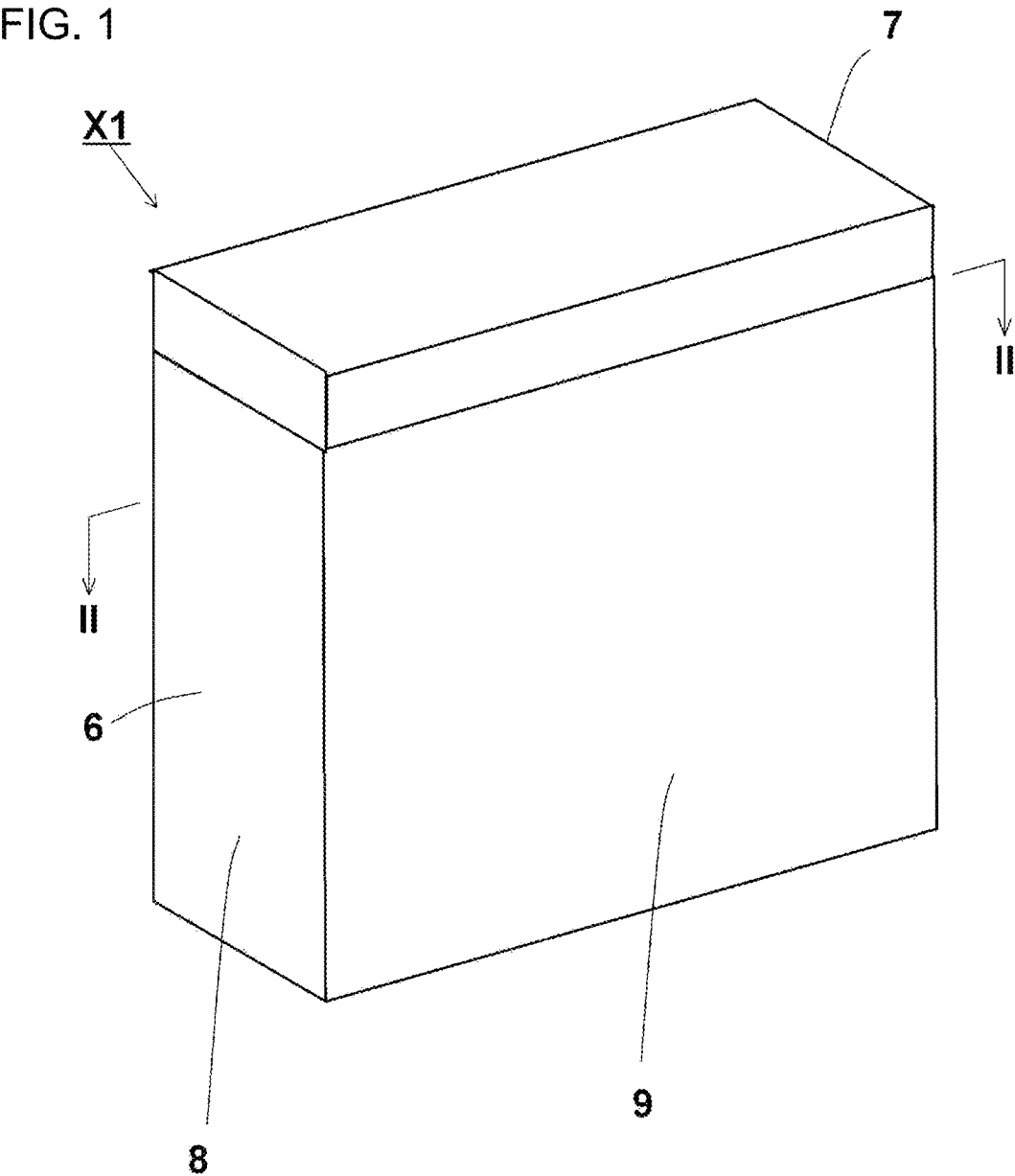
FIG. 1 is a perspective view of an electrochemical cell module.
Figure 2:
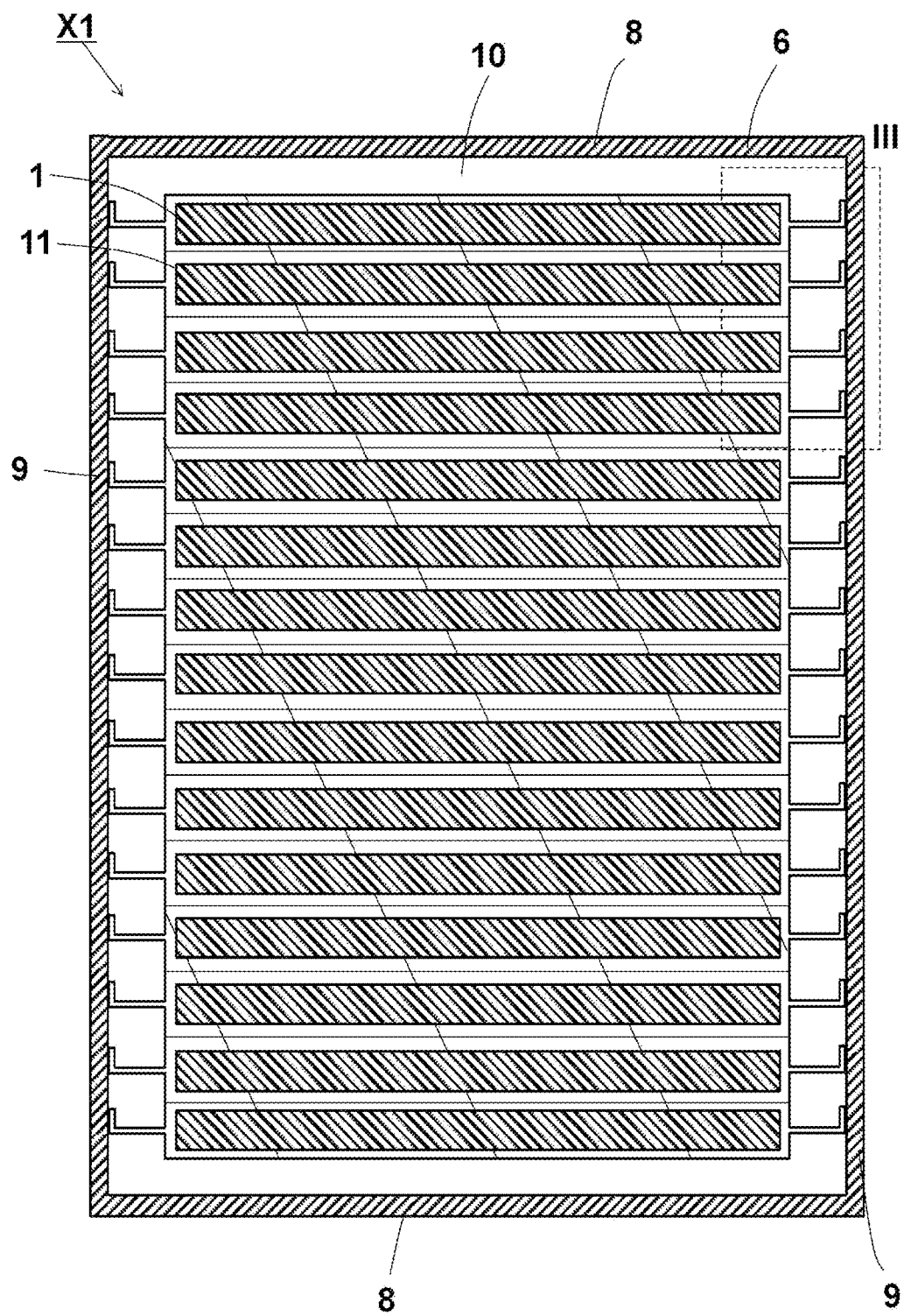
FIG. 2 is a cross-sectional view of the electrochemical cell module X1 in FIG. 1 taken along line II-II.

An electrochemical cell module will now be described in detail with reference to FIGS. 1 and 2. As shown in FIGS. 1 and 2, the electrochemical cell module includes a first electrochemical cell 1, a second electrochemical cell 11, and a housing 6 accommodating the first electrochemical cell 1 and the second electrochemical cell 11.

The first electrochemical cell 1 functions as a battery in the electrochemical cell module. The first electrochemical cell 1 is, for example, a lithium-ion battery. The first electrochemical cell 1 may be, for example, plate-like and have first main surfaces and side surfaces. The first electrochemical cell 1 includes a first electricity generator 2, a first casing 3, and first terminals 4. The first electrochemical cell 1 electrically connected to an external device can supply electricity to the external device.

The first electricity generator 2 charges and discharges through an electrochemical reaction. The first electricity generator 2 includes, for example, a positive electrode, a negative electrode, and a separator between the positive electrode and the negative electrode. The first electricity generator 2 may exchange cations and anions between the positive electrode and the negative electrode through the separator. The first electricity generator 2 with the positive electrode and the negative electrode electrically connected to an external device can supply electricity to the external device.

The first electricity generator 2 is, for example, a stack of the positive electrode, the separator, and the negative electrode. The first electricity generator 2 is, for example, plate-like. The first electricity generator 2 has, for example, the positive electrode, the separator, and the negative electrode stacked in the thickness direction of the plate.

The positive electrode and the negative electrode are, for example, electrochemically active. The positive electrode and the negative electrode may include, for example, an active material and an electrolyte. The electrolyte may be, for example, a solvent containing salt or a solvent mixture containing salt.

More specifically, the positive electrode and the negative electrode may include, for example, the active material and the electrolyte described in U.S. Provisional Patent Application Publication No. 61/787,382 entitled Semi-Solid Electrodes Having High Rate Capability and U.S. Provisional Patent Application Publication No. 61/787,372 entitled Asymmetric Battery Having a Semi-Solid Cathode and High Energy Density Anode. The positive electrode and the negative electrode may include, for example, an additive.

The separator allows exchange of cations and anions between the positive electrode and the negative electrode. For example, the separator may have pores for passage of cations and anions. The separator may be formed from, for example, a porous insulating material. More specifically, the separator may be formed from, for example, a polyolefin or polyvinyl chloride. The electricity generator 2 can electrically insulate the positive electrode and the negative electrode from each other with the separator.

The plate-like first electricity generator 2 may have, for example, a length of 50 to 500 mm, a width of 50 to 300 mm, and a thickness of 0.1 to 2.0 mm.

The first casing 3 has a space for enclosing the first electricity generator 2. The first casing 3 protects the first electricity generator 2 from the external environment. More specifically, the first casing 3 protects the first electricity generator 2 from oxygen and moisture contained in the atmosphere. The first casing 3 entirely covers the first electricity generator 2. The first casing 3 is, for example, a bag. The first casing 3 is formed from, for example, a single member shaped into a bag. The first casing 3 may also be formed by, for example, welding two members together. The first casing 3 may be, for example, rectangular as viewed in the stacking direction of the positive electrode, the separator, and the negative electrode.

The first casing 3 may include, for example, an insulating material. This allows the first casing 3 to be less likely to cause a short-circuit between the first electricity generator 2 and the external environment. In other words, the first casing 3 may protect the first electricity generator 2 from the external environment. The first casing 3 includes, for example, a resin material. More specifically, the resin material may be, for example, polyethylene terephthalate or polyethylene.

Figure 9:
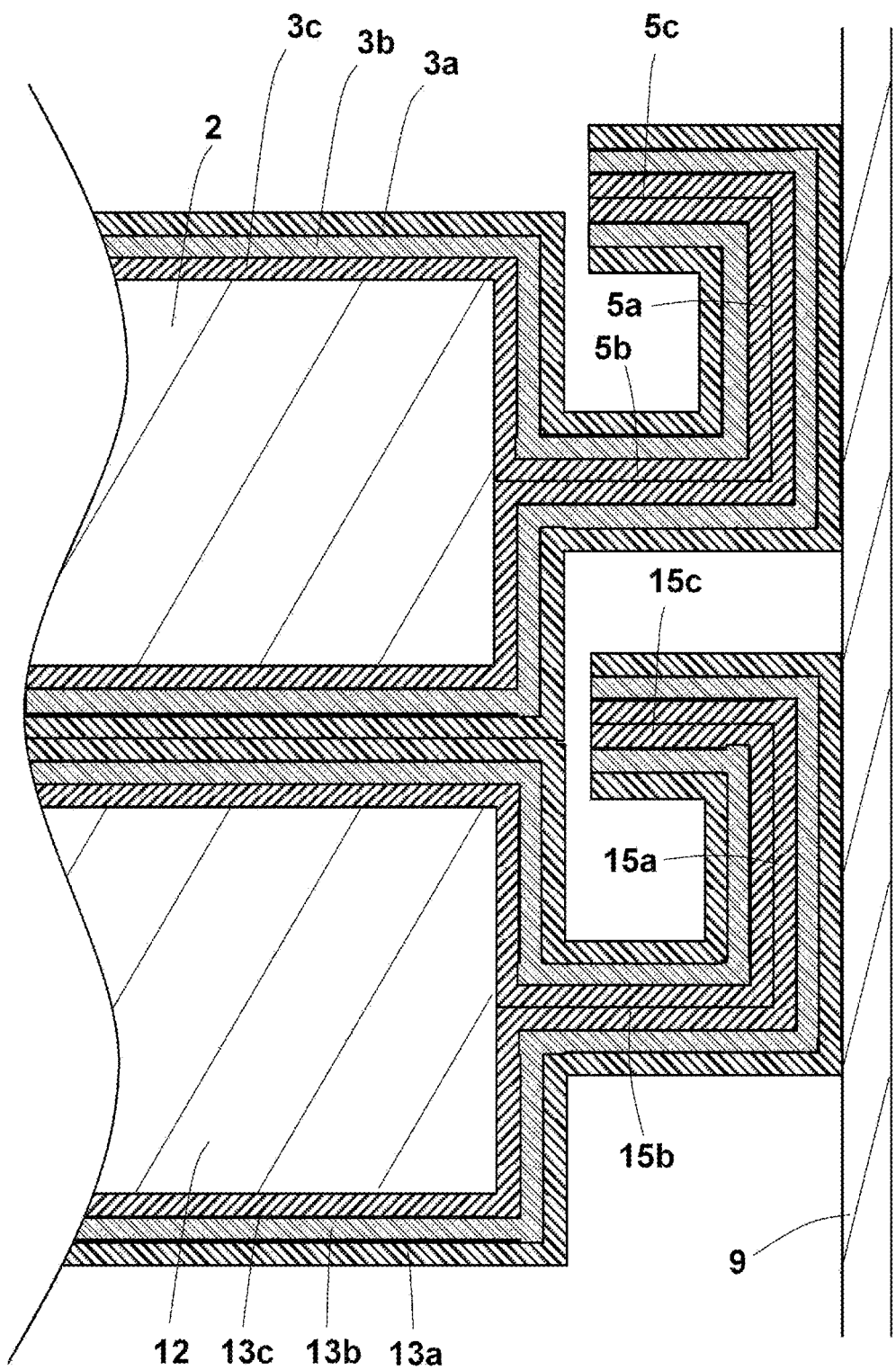
FIG. 9 is an enlarged view of area IX in FIG. 8.

The first casing 3 may be, for example, multilayered. The first casing 3 may be, for example, three-layered as shown in FIG. 9 (described later). More specifically, the first casing 3 may include, for example, a first insulating layer 3a, a moisture-proof layer 3b, and a second insulating layer 3c. The moisture-proof layer 3b is, for example, located between the first insulating layer 3a and the second insulating layer 3c. More specifically, the moisture-proof layer 3b may be covered with, for example, the first insulating layer 3a and the second insulating layer 3c.

The first insulating layer 3a includes, for example, a resin material. More specifically, the resin material may be a heat-resistant resin material. More specifically, the heat-resistant resin material melts at 150 to 300° C. The heat-resistant resin material may be, for example, polyethylene terephthalate or polyethylene naphthalate.

The moisture-proof layer 3b prevents oxygen or moisture penetrating the first insulating layer 3a from reaching the second insulating layer 3c. The moisture-proof layer 3b includes, for example, a metal material. More specifically, the metal material may be, for example, aluminum or copper.

The second insulating layer 3c includes, for example, a resin material. More specifically, the resin material may be a thermally adhesive resin material. More specifically, the thermally adhesive resin material melts at temperatures lower than 150° C. The thermally adhesive resin material may be, for example, polyethylene or polypropylene.

The rectangular first casing 3 as viewed in the direction perpendicular to the main surface of the first electricity generator 2 may have, for example, a length of 60 to 600 mm, a width of 60 to 400 mm, and a thickness of 1 to 20 mm.

The first terminals 4 electrically connect the first electricity generator 2 to an external device. The first terminals 4 are, for example, plate-like. More specifically, the first terminals 4 are, for example, quadrangular as viewed in the direction perpendicular to the first main surfaces of the first electrochemical cell 1. The first terminals 4 may also be, for example, rectangular. The rectangular first terminals 4 may include, for example, long sides and short sides.

The first terminals 4 are in contact with the first electricity generator 2 as viewed in the direction perpendicular to the first main surfaces of the first electrochemical cell 1. The first terminals 4 are on one peripheral side of the first electricity generator 2 as viewed in the direction perpendicular to the first main surfaces of the first electrochemical cell 1. The first terminals 4 protrude outward from the first electrochemical cell 1 for electrical connection to an external device. The first terminals 4 are electrically connect to external connection terminals outside the first electrochemical cell 1.

The first terminals 4 are, for example, electrically conductive. The first terminals 4 may include, for example, a metal material. More specifically, the metal material may be, for example, aluminum or copper. The plate-like first terminals 4 may have, for example, a length of 30 to 100 mm, a width of 10 to 100 mm, and a thickness of 0.1 to 0.5 mm. The first terminals 4 may dissipate heat out of the electrochemical cell module through heat conduction.

The housing 6 has a space for accommodating the first electrochemical cell 1. The housing 6 protects the first electrochemical cell 1 from the external environment. More specifically, the housing 6 protects the first electrochemical cell 1 against an external force received from the external environment. The housing 6 is, for example, a box. The housing 6 may also be, for example, a rectangular prism. The housing 6 may be formed by, for example, shaping a single member into a rectangular prism. The housing 6 may also include, for example, two or more members combined into a rectangular prism.

The housing 6 includes, for example, a metal material. The metal material may be, for example, aluminum or stainless steel. This allows heat generated in the first electrochemical cell 1 to easily transfer to the housing 6, thus improving heat dissipation. The first electrochemical cell 1 may thus have a longer service life.

The housing 6 may include, for example, multiple parts. The housing 6 may include, for example, two main surface plates 8, two side plates 9, a bottom plate 10, and a terminal cover 7. More specifically, the housing 6 may be formed from a metal material and a resin material in combination.

The terminal cover 7 protects the first terminals 4 of the first electrochemical cell 1. The terminal cover 7 thus faces the first terminals 4 of the first electrochemical cell 1. The terminal cover 7 may have any shape, for example, that covers the first terminals 4 of the first electrochemical cell 1. The terminal cover 7 may include, for example, a quadrangular bottom surface facing the first terminals 4 of the first electrochemical cell 1 and four side surfaces connected to the four sides of the bottom surface of the terminal cover 7.

The bottom surface of the terminal cover 7 may be, for example, rectangular as viewed in the direction perpendicular to the surface facing the first terminals 4. The side surfaces of the terminal cover 7 may be rectangular as viewed in the direction perpendicular to each side surface of the terminal cover 7. The terminal cover 7 may be formed from, for example, a resin material. More specifically, the resin material may be polyethylene terephthalate or polyethylene naphthalate. The rectangular bottom surface of the terminal cover 7 may have, for example, a length of 200 to 600 mm, a width of 50 to 300 mm, and a thickness of 0.1 to 5 mm. The rectangular side surfaces of the terminal cover 7 may have, for example, a length of 200 to 600 mm, a width of 50 to 300 mm, and a thickness of 0.1 to 5 mm.

The main surface plates 8 protects the first main surfaces of the first electrochemical cell 1. The main surface plates 8 thus face the first main surfaces of the first electrochemical cell 1. The main surface plates 8 may also be, for example, in contact with the first main surfaces of the first electrochemical cell 1. The main surface plates 8 may be rectangular as viewed in the direction perpendicular to the first main surfaces of the first electrochemical cell 1. The main surface plates 8 may be formed from, for example, a metal material. More specifically, the metal material may be, for example, aluminum or stainless steel. This allows heat generated in the first electricity generator 2 in the first electrochemical cell 1 to easily dissipate out of the housing 6. The first electrochemical cell 1 may thus have a longer service life.

The main surface plates 8 may also be formed from, for example, a resin material. The resin material may be, for example, a heat-resistant resin material with a high melting point. The heat-resistant resin material may be, for example, polyethylene terephthalate. This reduces the likelihood of a short-circuit forming between the first electrochemical cell 1 and the external environment. The rectangular main surface plates 8 may have, for example, a length of 200 to 600 mm, a width of 50 to 300 mm, and a thickness of 0.5 to 5 mm.

The side plates 9 protect the side surfaces of the first electrochemical cell 1 and the second electrochemical cell 11. The side plates 9 thus face the side surfaces of the first electrochemical cell 1. The side plates 9 may also be, for example, in contact with the first electrochemical cell 1. The side plates 9 may be, for example, rectangular as viewed in the direction perpendicular to the side surfaces of the first electrochemical cell 1. The side plates 9 may be formed from, for example, a metal material. More specifically, the side plates 9 may be formed from, for example, aluminum or stainless steel. This allows heat generated in the first electrochemical cell 1 to dissipate easily. The first electrochemical cell 1 may thus have a longer service life.

The side plates 9 may also be formed from, for example, a resin material. The resin material may be, for example, a heat-resistant resin material. The heat-resistant resin material may be, for example, polyethylene terephthalate. This reduces the likelihood of a short-circuit forming between the first electrochemical cell 1 and the external environment. The rectangular side plates 9 as viewed in the direction perpendicular to the side surfaces of the first electrochemical cell 1 may have, for example, a length of 200 to 600 mm, a width of 50 to 300 mm, and a thickness of 0.5 to 5 mm.

The bottom plate 10 protects the surface of the first electrochemical cell 1 opposite to the surface from which the first terminals 4 protrude. In other words, the bottom plate 10 faces the surface of the first electrochemical cell 1 opposite to the surface from which the first terminals 4 protrude. The bottom plate 10 may also be, for example, in contact with the surface of the first electrochemical cell 1 opposite to the surface from which the first terminals 4 protrude. The bottom plate 10 may be rectangular as viewed in the direction perpendicular to the surface of the first electrochemical cell 1 opposite to the surface from which the first terminals 4 protrude. The bottom plate 10 may be formed from, for example, a metal material. The metal material may be, for example, aluminum or stainless steel. This allows heat generated in the first electrochemical cell 1 to dissipate easily out of the housing 6. The first electrochemical cell 1 may thus have a longer service life.

The bottom plate 10 may also be formed from, for example, a resin material. The resin material may be, for example, a heat-resistant resin material. The heat-resistant resin material may be, for example, polyethylene terephthalate. This reduces the likelihood of a short-circuit forming between the first electrochemical cell 1 and the external environment. The bottom plate 10 may also be formed by, for example, bending part of a side plate 9 or a main surface plate 8. The rectangular bottom plate 10 as viewed in the direction perpendicular to the surface opposite to the surface from which the first terminals 4 protrude may have, for example, a length of 200 to 600 mm, a width of 50 to 300 mm, and a thickness of 0.5 to 5 mm.

The first electrochemical cell 1 includes a first peripheral portion 5. The first peripheral portion 5 corresponds to the periphery of the first casing 3. More specifically, the first peripheral portion 5 corresponds to an area from the outer periphery of the first casing 3 to the outer periphery of the first electricity generator 2 as viewed in the direction perpendicular to the first main surfaces of the first electrochemical cell 1. In other words, the first peripheral portion 5 corresponds to a portion of the first casing 3 without overlapping the first electricity generator 2 as viewed in the direction perpendicular to the first main surfaces of the first electrochemical cell 1. The first peripheral portion 5 may be, for example, a strip as viewed in the direction perpendicular to the first main surfaces of the first electrochemical cell 1. The first peripheral portion 5 may have, for example, a width of 1 to 30 mm.

The first peripheral portion 5 of the first casing 3 is in contact with the side plates 9 of the housing 6. More specifically, the first peripheral portion 5 is bent to have its first main surface in contact with the side plates 9 (inner side surfaces). This increases the contact area between the first peripheral portion 5 and the side plates 9 of the housing 6 for transferring heat from the first peripheral portion 5 to the side plates 9 of the housing 6. The first peripheral portion 5 thus allows heat generated in the first electricity generator 2 in the first electrochemical cell 1 to easily transfer to the housing 6. The first electrochemical cell 1 may thus have a longer service life.

The first peripheral portion 5 being in contact with the side plates 9 herein refers to, in addition to the first peripheral portion 5 in direct contact with the side plates 9, the first peripheral portion 5 bonded to the side plate 9 with a member such as a bond 16.

The first peripheral portion 5 may be bent with, for example, a press. The press includes, for example, a base for receiving the first electrochemical cell 1 and a punch for bending the first peripheral portion 5. The first peripheral portion 5 may be bent by, for example, placing a portion to be bent protruding from an end of the base and then pulling down the punch to the portion to be bent.

The first peripheral portion 5 may be bent at least to have its first main surface in contact with the side plates 9. The first peripheral portion 5 may be bent at, for example, an angle of 45 to 135° with the first main surfaces of the first electrochemical cell 1. The angle at which the first peripheral portion 5 is bent refers to the angle between the first peripheral portion 5 and the first main surfaces of the first electrochemical cell 1.

Figure 5:
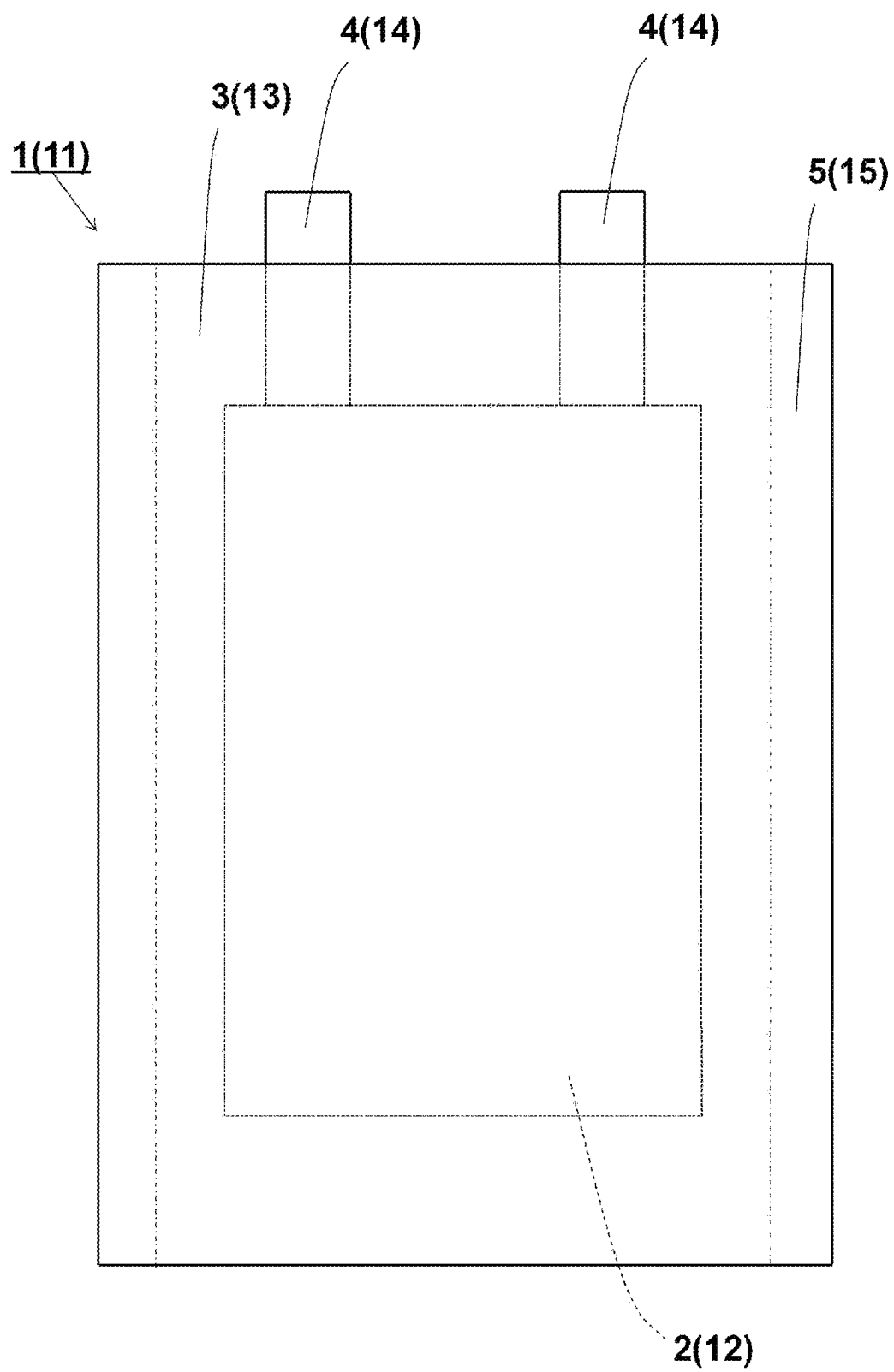
FIG. 5 is a top view of a stack of a first electrochemical cell and a second electrochemical cell removed from a housing of the electrochemical cell module X1 as viewed in the stacking direction of the first electrochemical cell and the second electrochemical cell.

When, for example, the first casing 3 is rectangular as viewed in the direction perpendicular to the first main surfaces as shown in FIG. 5, the first peripheral portion 5 may be bent along the long sides of the first casing 3. More specifically, an edge formed by bending the first peripheral portion 5 may extend in a direction intersecting at least one of the short sides of the first casing 3. No edge may form when the first main surfaces of the first electrochemical cell 1 intersects with the first main surface of a first portion 5a of the first peripheral portion 5 including the long sides of the first casing 3. This increases the contact area between the first peripheral portion 5 of the first casing 3 and the side plates 9, allowing heat to easily transfer from the first casing 3 to the side plates 9. The first electrochemical cell 1 may thus have a longer service life.

Figure 3:
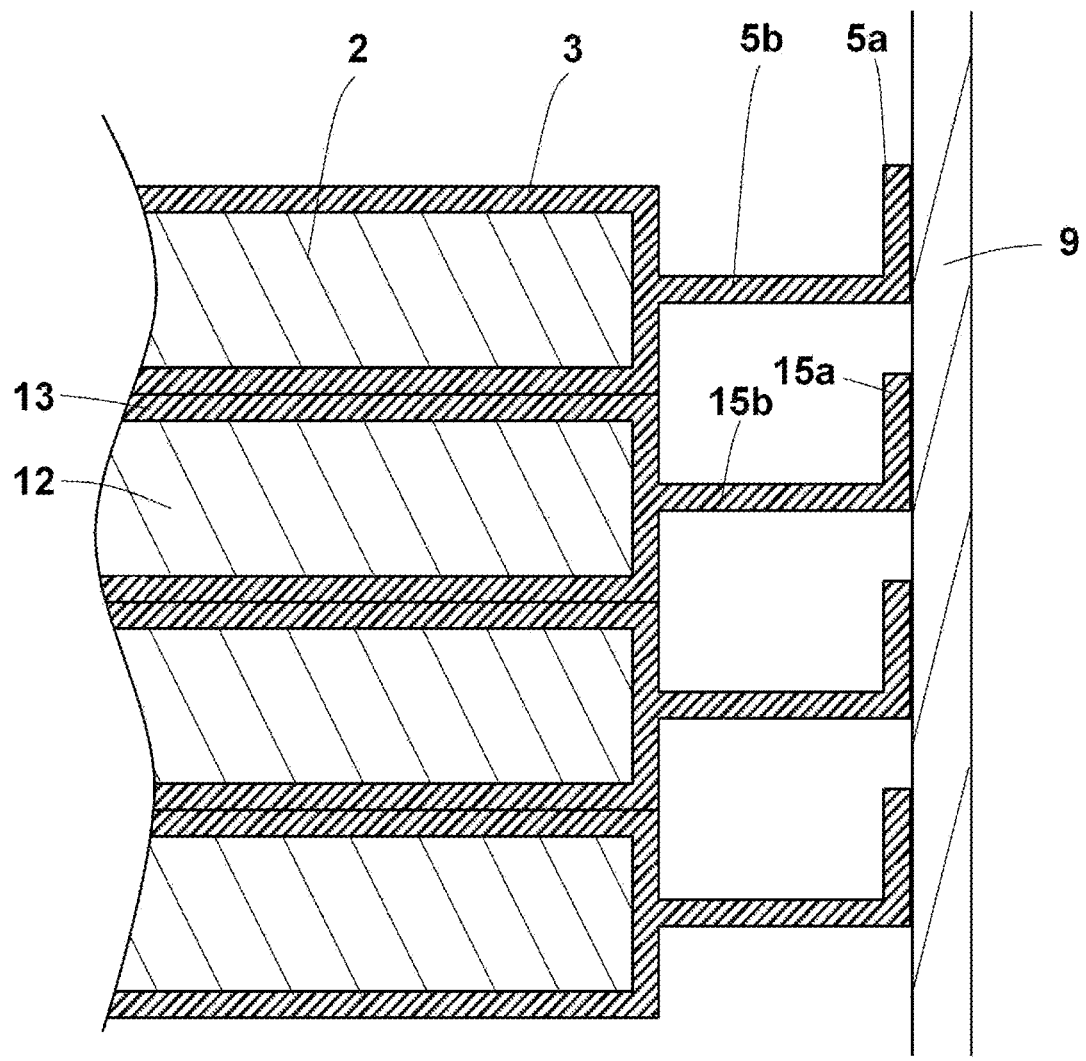
FIG. 3 is an enlarged view of area III in FIG. 2.
Figure 4:
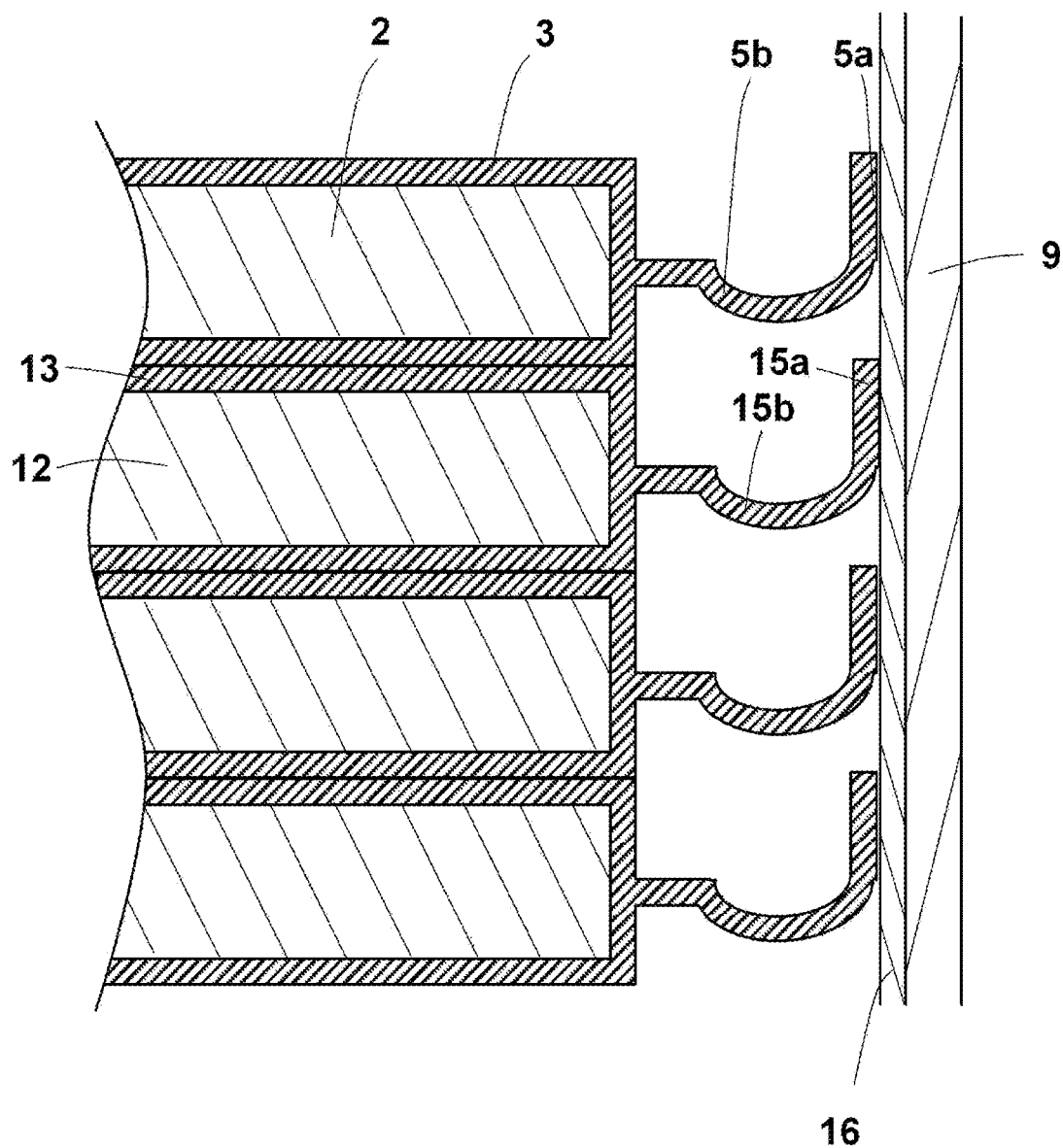
FIG. 4 is an enlarged view of another electrochemical cell module corresponding to FIG. 3.

As shown in FIG. 3, the first peripheral portion 5 includes the first portion 5a in contact with the side plate 9 and a second portion 5b inside the housing 6. The second portion 5b connects the first portion 5a to a portion in which the first electricity generator 2 and the first casing 3 overlap each other as viewed in the stacking direction of the first electrochemical cell 1 and the second electrochemical cell 11. The second portion 5b may be, for example, flat as shown in FIG. 3. The second portion 5b may be, for example, curved as shown in FIG. 4. This allows stress between the side plate 9 and the first portion 5a to be absorbed. Thus, an external force applied to the housing 6 is less likely to be transmitted to the first electrochemical cell 1. The first electrochemical cell 1 is thus less likely to be damaged.

Figure 6:
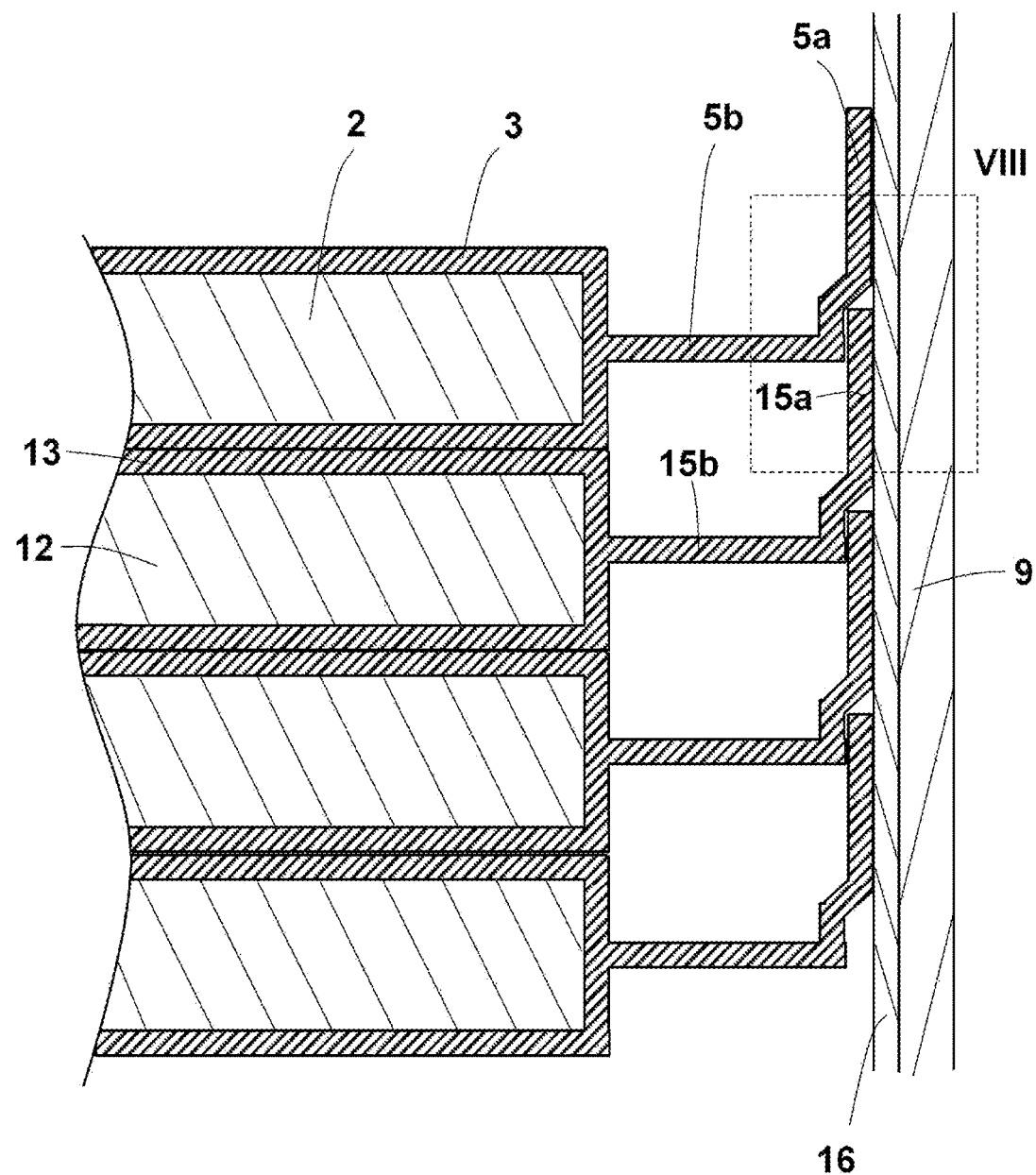
FIG. 6 is an enlarged view of another electrochemical cell module corresponding to FIG. 3.

The first portion 5a may be bonded to the side plate 9 with, for example, the bond 16 as shown in FIG. 6. The bond 16 is thus between the first portion 5a and the side plate 9. This causes less air to enter a space between the first portion 5a and the side plate 9. This allows heat generated in the first electrochemical cell 1 to easily transfer to the housing 6. The first electrochemical cell 1 may thus have a longer service life.

The bond 16 may be, for example, a resin material. The resin material may be, for example, a polyvinyl acetate resin or an acrylic resin. The bond 16 may be, for example, a single resin material or a mixture of resin materials.

The housing 6 may accommodate the first electrochemical cell 1 and the second electrochemical cell 11. The second electrochemical cell 11 supplies electricity to an external device, similarly to the first electrochemical cell 1. In the electrochemical cell module, the first electrochemical cell 1 and the second electrochemical cell 11 may be stacked on one another. In the electrochemical cell module, the first electrochemical cell 1 and the second electrochemical cell 11 are connected to each other in parallel. This may increase the capacity of the electrochemical cell module. The first electrochemical cell 1 and the second electrochemical cell 11 may also be connected to each other in series. This may increase the voltage across the electrochemical cell module.

The second electrochemical cell 11 faces the first electrochemical cell 1 in the housing 6. The second electrochemical cell 11 includes a second electricity generator 12, a second casing 13, and second terminals 14 as shown in FIG. 5. The second electrochemical cell 11 has the same shape as the first electrochemical cell 1 in the electrochemical cell module. The second electrochemical cell 11 may be shaped, for example, differently from the first electrochemical cell 1. The second electrochemical cell 11 is stacked on the first electrochemical cell 1 with their outer peripheries aligned in the electrochemical cell module. The second electrochemical cell 11 may also be stacked on the first electrochemical cell 1 without their outer peripheries being aligned with each other.

The first electricity generator 2 and the second electricity generator 12 are stacked on each other with their long sides aligned and their short sides aligned as viewed in the stacking direction of the first electrochemical cell 1 and the second electrochemical cell 11. The first casing 3 and the second casing 13 are stacked on each other with their long sides aligned and their short sides aligned as viewed in the stacking direction of the first electrochemical cell 1 and the second electrochemical cell 11.

The second electricity power generator 12 may be formed from, for example, the material included in the first electricity generator 2. More specifically, the second electricity generator 12 may be formed from the same material as for the first electricity generator 2. The second electricity generator 12 may also be formed from, for example, a material different from the material for the first electricity generator 2.

The second casing 13 has the same shape as the first casing 3. The second casing 13 may be shaped, for example, differently from the first casing 3. The second casing 13 may be formed from, for example, the material included in the first casing 3. More specifically, the second casing 13 may be formed from the same material as for the first casing 3. The second casing 13 may also be formed from, for example, a material different from the material for the first casing 3. The second electrochemical cell 11 may have, for example, the same dimensions as the first electrochemical cell 1. The second electrochemical cell 11 may also have, for example, dimensions different from the dimensions of the first electrochemical cell 1.

The second electrochemical cell 11 includes a second peripheral portion 15. The second peripheral portion 15 corresponds to the periphery of the second casing 13. More specifically, the second peripheral portion 15 corresponds to an area from the outer periphery of the second casing 13 to the outer periphery of the second electricity generator 12 as viewed in the stacking direction of the first electrochemical cell 1 and the second electrochemical cell 11. In other words, the second electricity generator 12 and the second casing 13 do not overlap each other in the second peripheral portion 15. The second peripheral portion 15 may have, for example, the same dimensions as the first peripheral portion 5. The second peripheral portion 15 may also have, for example, dimensions different from the dimensions of the first peripheral portion 5.

Figure 7:
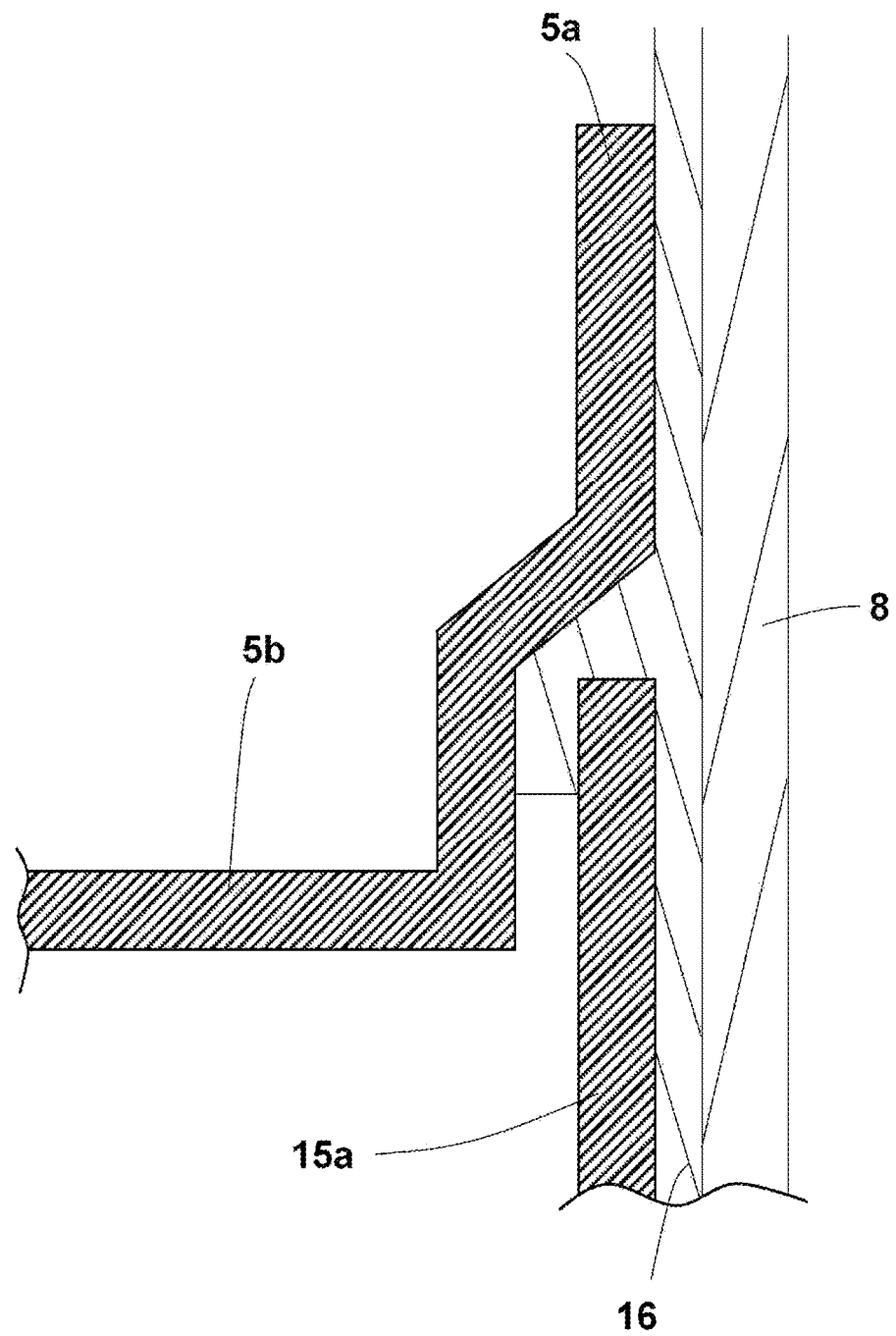
FIG. 7 is an enlarged view of area VII in the electrochemical cell module shown in FIG. 6.

The second electrochemical cell 11 may include, in the second peripheral portion 15, a first portion 15a in contact with the side plates 9. As shown in FIG. 6, the first portion 5a of the first electrochemical cell 1 and the first portion 15a of the second electrochemical cell 11 may overlap each other as viewed in the direction perpendicular to the side plate 9. In this structure, as shown in FIG. 7, the bond 16 may bond the first portion 5a of the first peripheral portion 5 to the housing 6, the first portion 15a of the second peripheral portion 15 to the housing 6, and the first peripheral portion 5 to the second peripheral portion 15. The bond 16 is thus located between the first portion 5a of the first peripheral portion 5 and the housing 6, between the first portion 15a of the second peripheral portion 15 and the housing 6, and between the first peripheral portion 5 and the second peripheral portion 15. This causes less air to enter a space formed in the overlap portion between the first portion 5a of the first electrochemical cell 1 and the first portion 15a of the second electrochemical cell 11. This reduces the likelihood of heat accumulating in the overlap portion between the first portion 5a of the first electrochemical cell 1 and the first portion 15a of the second electrochemical cell 11. The first electrochemical cell 1 and the second electrochemical cell 11 may thus have a longer service life.

Figure 8:
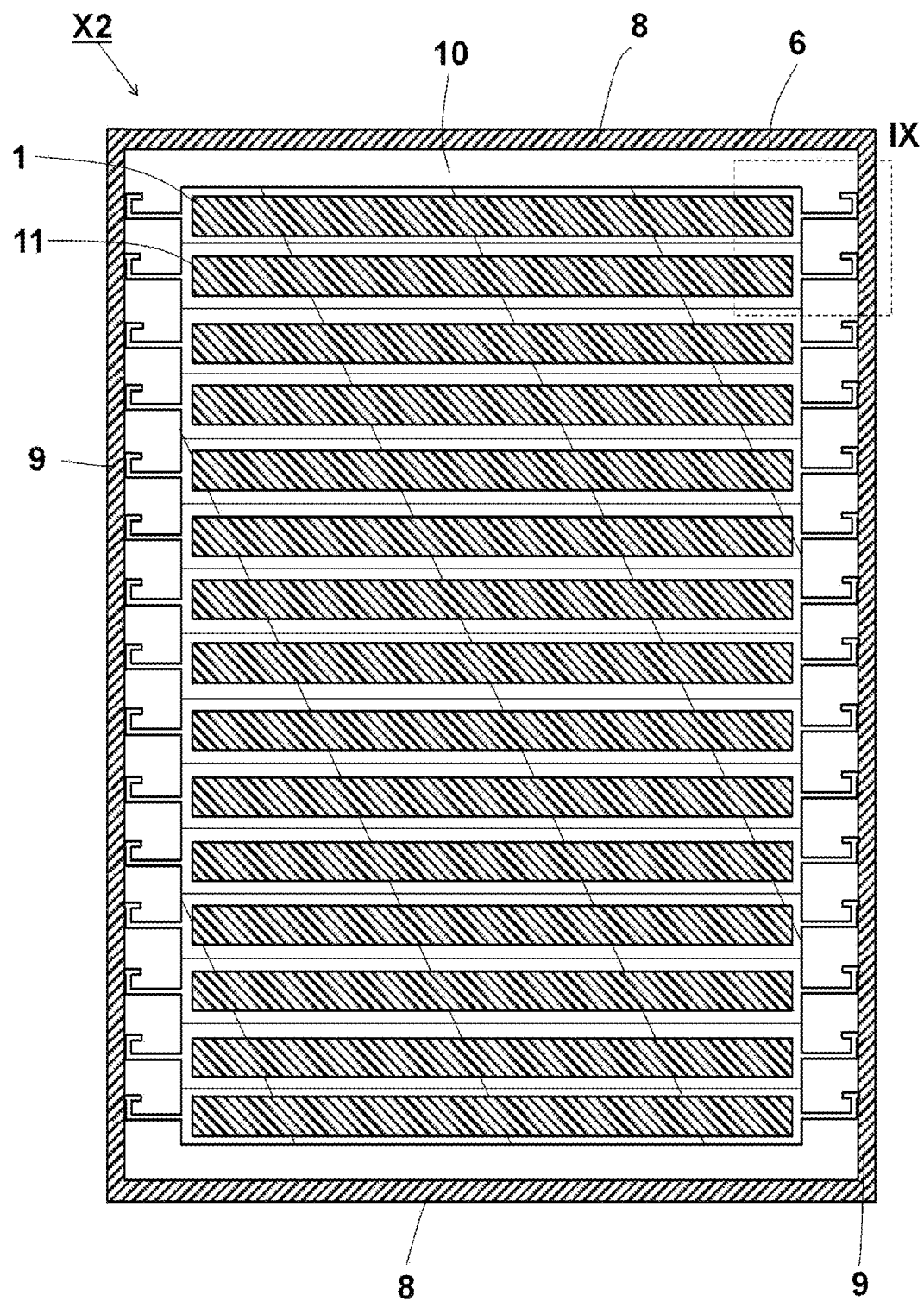
FIG. 8 is a cross-sectional view of an electrochemical cell module X2 corresponding to FIG. 2.

As shown in FIGS. 8 and 9, the first peripheral portion 5 may include, for example, a third portion 5c. The third portion 5c extends toward the first electricity generator 2 from an end of the first portion 5a opposite to the other end of the first portion 5a connected to the second portion 5b. One end of the third portion 5c, at which the moisture-proof layer 3b in the first casing 3 is exposed, is thus bent away from the housing 6 and is at a distance from the housing 6. For the housing 6 including a metal material (more specifically, for the side plate 9 formed from a metal material) and for the moisture-proof layer 3b including a metal material (more specifically, for the moisture-proof layer 3b being a metal layer), a short-circuit may be less likely to form between the moisture-proof layer 3b and the side plate 9.

The third portion 5c may be, for example, along the first portion 5a. The third portion 5c may be, for example, a strip as viewed in the direction perpendicular to the first main surfaces of the first electrochemical cell 1. The third portion 5c may have, for example, a length of 1 to 30 mm and a width of 1 to 30 mm. The third portion 5c may be connected to the first portion 5a at, for example, an angle of 0 to 90°.

Figure 10:
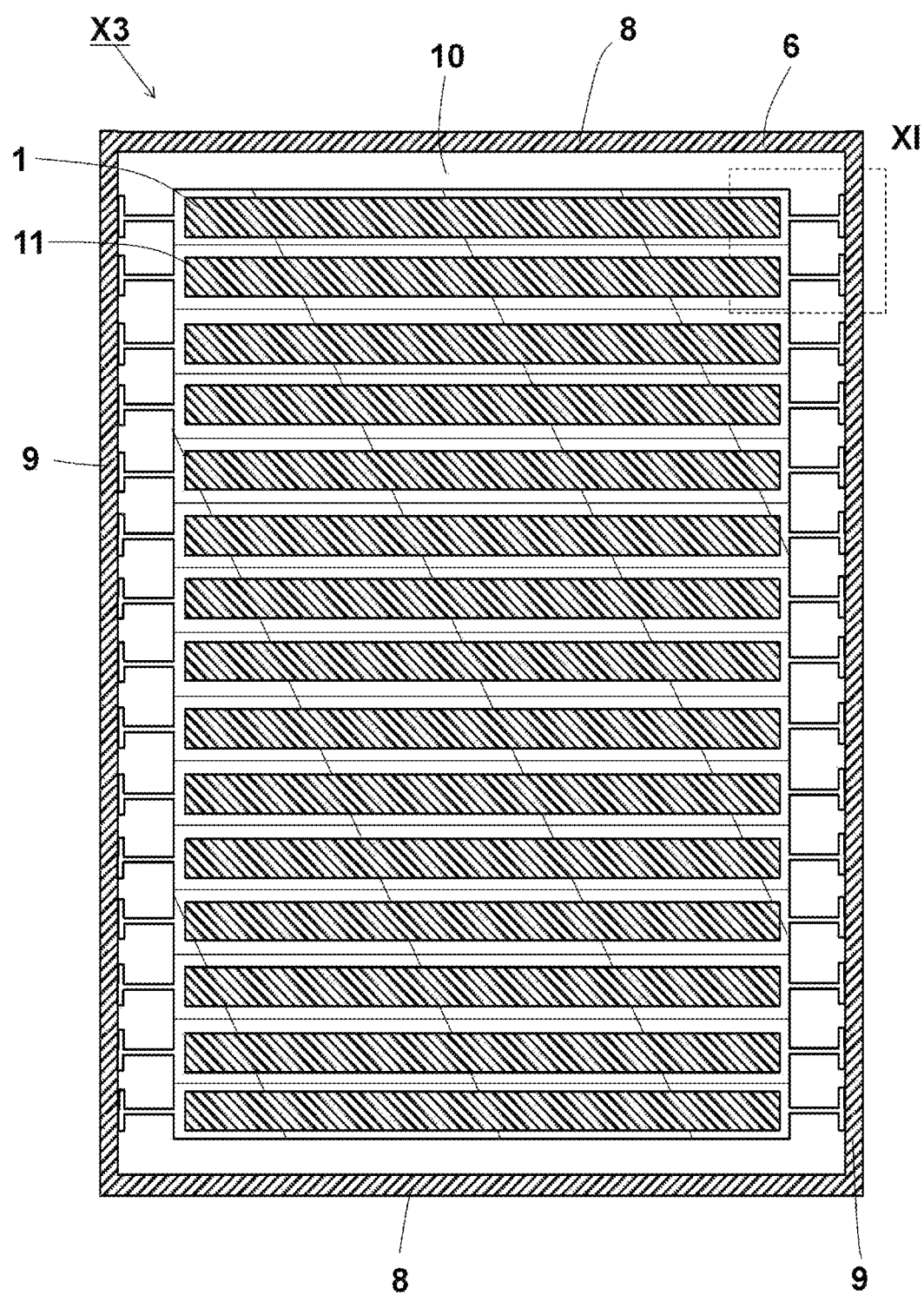
FIG. 10 is a cross-sectional view of an electrochemical cell module X3 corresponding to FIG. 2.
Figure 11:
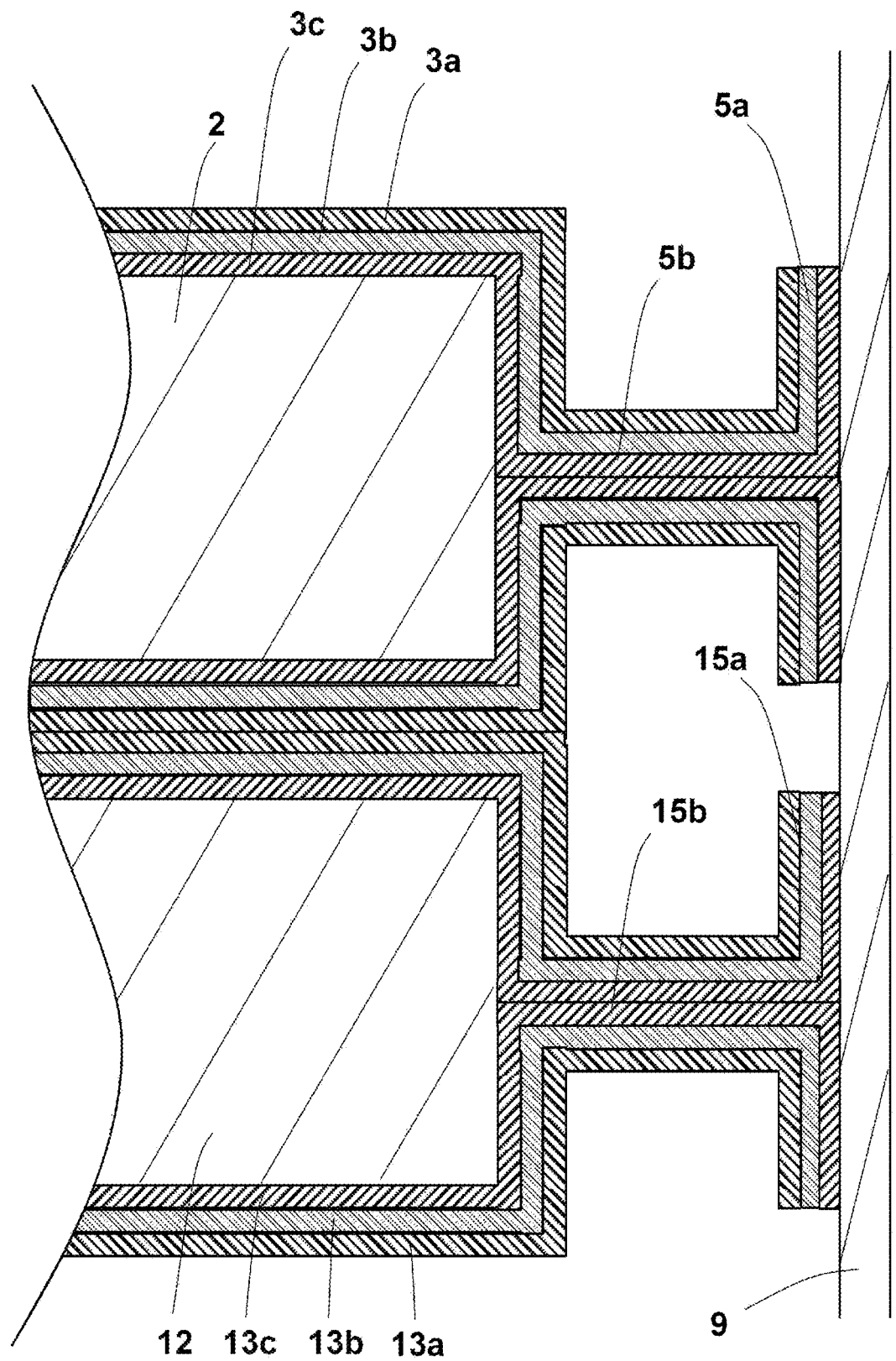
FIG. 11 is an enlarged view of area XI in FIG. 10.

As shown in FIGS. 10 and 11, the first casing 3 and the second casing 13 are each formed by stacking two sheets of a metal-resin composite film including a heat-resistant resin layer 3a, the moisture-proof layer 3b including a metal material (metal layer), and a thermally adhesive resin layer 3c. The moisture-proof layer 3b including a metal material (metal layer) may be located between the heat-resistant resin layer 3a and the thermally adhesive resin layer 3c. The moisture-proof layer 3b including a metal material (metal layer) may also be covered with, for example, the heat-resistant resin layer 3a and the thermally adhesive resin layer 3c. The first casing 3 and the second casing 13 are bonded to each other by having the thermally adhesive resin layers 3c of the two metal-resin composite films facing each other and then heating and sealing the peripheries of the two metal-resin composite films.

As shown in FIG. 11, the first portion 5a of the first peripheral portion 5 may have the thermally adhesive resin layers 3c in contact with the side plate 9 instead of facing each other. Each thermally adhesive resin layer 3c is thus located between the moisture-proof layer 3b including a metal material (metal layer) and the side plate 9 of the housing 6, reducing the likelihood of a short-circuit forming between the moisture-proof layer 3b including a metal material (metal layer) and the side plate 9. Further, the first portion 5a is bonded to the side plate 9 with the thermally adhesive resin layers 3c instead of using the bond 16.

For ease of explanation, FIGS. 1 to 11 show the electrochemical cells, the power generating devices, the casings, or the terminals in the same shape with their outer peripheries aligned with each other. However, the shapes may be slightly different with the outer peripheries slightly misaligned from each other. For example, the outer peripheries may be misaligned within the range of manufacturing errors. The housing 6 may accommodate a stack of three or more electrochemical cells, rather than the stack of the first electrochemical cell 1 and the second electrochemical cell 11 alone.

The present disclosure may be embodied in various forms without departing from the spirit or the main features of the present disclosure. The embodiments described above are thus merely illustrative in all respects. The scope of the present disclosure is defined not by the description given above but by the claims. Any modifications and alterations contained in the claims fall within the scope of the present invention.

REFERENCE SIGNS LIST

X1 to X3 electrochemical cell module
1 first electrochemical cell
2 first electricity generator
3 first casing
3a first insulating layer
3b moisture-proof layer
3c second insulating layer
4 first terminal
5 first peripheral portion
5a first portion
5b second portion
5c third portion
6 housing
7 terminal cover
8 main surface plate
9 side plate
10 bottom plate
11 second electrochemical cell
12 second electricity generator
13 second casing
14 second terminal
15 second peripheral portion
15a first portion
15b second portion
16 bond

The invention claimed is:

1. An electrochemical cell module, comprising:
a first plate-shaped electrochemical cell including a first electricity generator, a first casing, and a first main surface;
a second plate-shaped electrochemical cell including a second electricity generator, a second casing, and a second main surface;
a bond; and
a housing accommodating the first plate-shaped electrochemical cell and the second plate-shaped electrochemical cell, the first plate-shaped electrochemical cell being stacked on the second plate-shaped electrochemical cell in a first direction, wherein
the first casing includes a first peripheral portion bent and in contact with an inner side surface of the housing, the first peripheral portion not overlapping the first electricity generator in the first direction,
the second casing includes a second peripheral portion bent and in contact with the inner side surface of the housing, the second peripheral portion not overlapping the second electricity generator in the first direction,
the first peripheral portion and the second peripheral portion overlap each other in the first direction,
the bond bonds the housing and the first peripheral portion to each other, the housing and the second peripheral portion to each other, and the first peripheral portion and the second peripheral portion to each other,
each of the first peripheral portion and the second peripheral portion includes
a first portion extending in the first direction along the inner side surface of the housing, contacting the inner side surface of the housing, and being bonded to the inner side surface of the housing with the bond, and
a second portion extending in a second direction away from the inner side surface and connecting the first portion to a portion of the corresponding first or second casing that overlaps the electricity generator in the second direction, the second direction crossing the first direction, and
the first portion of the second peripheral portion overlaps the second portion of the first peripheral portion in the second direction.

2. The electrochemical cell module according to claim 1, wherein
the first casing is rectangular and includes a long side and a short side as viewed in the first direction, and
the first peripheral portion is bent along the long side.

3. An electrochemical cell module, comprising:
an electrochemical cell including
an electricity generator and
a casing; and
a housing accommodating the electrochemical cell, wherein
the casing includes a peripheral portion bent and in contact with an inner side surface of the housing, and
the peripheral portion includes
a first portion in contact with the inner side surface of the housing, and
a second portion connecting the first portion to a portion of the casing overlapping the electricity generator, wherein the second portion is curved to have an arc shape.

4. The electrochemical cell module according to claim 1, wherein
the casing includes a first resin layer, a metal layer, and a second resin layer, and
the metal layer is between the first resin layer and the second resin layer.

5. The electrochemical cell module according to claim 1, the casing includes a metal-resin composite film including a heat-resistant resin layer, a metal layer, and a thermally adhesive resin layer, and
the metal layer is between the heat-resistant resin layer and the thermally adhesive resin layer.

6. The electrochemical cell module according to claim 1, wherein
each of the first peripheral portion and the second peripheral portion further includes a connecting portion connecting the first portion and the second portion,
the connecting portion includes
a first connecting portion extending from the second portion in the first direction, and
a second connecting portion connecting the first connecting portion to the first portion, and
the second connecting portion is inclined with respect to the first connecting portion and the first portion.

7. The electrochemical cell module according to claim 6, wherein
the first portion of the second peripheral portion overlaps the first connecting portion in the second direction.

* * * * *